UNITED STATES PATENT OFFICE 2,429,166

PROCESS FOR THE SEPARATION AND PURIFICATION OF STEREOISOMERIC HYDROPHENANTHRENE CARBOXYLIC ACIDS AND CYCLIC HOMOLOGUES THEREOF

Karl Miescher, Riehen, and Jules Heer, Basel, Switzerland, assignors to Ciba Pharmaceutical Products, Inc., Summit, N. J., a corporation of New Jersey No Drawing. Application November 21, 1945, Serial No. 630,117. In Switzerland July 6, 1945

9 Claims. (Cl. 260—520)

According to the present invention stereoisomeric hydrophenanthrene-2-carboxylic acids containing in 1-position and, if desired, also in 2-position a hydrocarbon radical, further in 7-position a phenolic hydroxyl or a group convertible thereto, and ring-homologues of such carboxylic acids, are separated and purified by treating the acids or their salts with solutions the pH value of which is gradually changed and, if desired, subjecting the acid fractions obtained to further purification and separation treatments.

The starting materials used can be obtained, for example, by the action of fused alkali on oestrogenic hormones, further according to the processes described in patent application Serial No. 542,812, filed June 29, 1944, and patent application Serial No. 622,092, filed October 12, 1945, or similar processes.

It is known that oestrone can be converted by fused alkali with cleavage of the 5-membered ring, into a monocarboxylic acid which exhibits oestrogenic activity (MacCorquodale, Levin, Thayer and Doisy, J. Biol. Chem., vol. 101, page 753 [1933]) and according to applicants' investigations has the formula

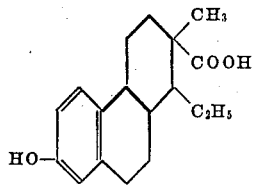

The same or similar acids can also be obtained by the action of fused alkali on oestradiol, equilenine, dihydroequilenine and the like (German Patents Nos. 705,852 and 719,572). According to known prescriptions working up is effected by dissolving the melt in water, saturating the strongly alkaline solution with carbon dioxide for the purpose of separating the starting material and the like, and precipitating with a mineral acid the portion which has remained in solution. Whereas a uniform carboxylic acid is thus obtained from oestrone and oestradiol, it has been found that highly impure acid mixtures are formed from still less saturated oestrogenic hormones.

According to the process of German Patent No. 719,572 a carboxylic acid of melting point 120–122° C. is obtained from equilenine having a threshold value of 2.5 γ when applied orally to the rat. According to the present process it is advantageous to precipitate the aqueous solution of the melt of equilenine or dihydroequilenine with mineral acid, take up the precipitation in ether and extract the acids formed with sodium carbonate. By adjusting the pH value of the sodium carbonate solution to about 7.5 the inactive by-acids are precipitated and can be separated by filtration. In solution remains a mixture of two stereoisomeric, optically active carboxylic acids. When lowering the pH value to about 5.8 to 6.8, the inactive isomer is precipitated at first which melts in pure state at 254–256° C. The other highly active isomer is finally obtained by further addition of a mineral acid. In pure state it melts at 161–162° C. The oral threshold value amounts only to 0.05–0.1 γ. This acid is therefore at least 25 times as active as that described in German Patent No. 719,572 of melting point 120–122° C. The latter contains apparently only 4 per cent. of the active portion. The separation of the stereoisomeric carboxylic acids obtained, for example, according to the processes of patent application Serial No. 542,812, filed June 29, 1944, and patent application Serial No. 622,092, filed October 12, 1945, can be effected in quite similar manner.

Instead of starting from solutions of the salts of the acid mixtures, the solid acids can also be shaken with aqueous solutions whose pH value is gradually raised, whereupon at first only the strong acids, especially the active acids, enter into solution. In the latter case a pH value of less than 6 is necessary. Incidentally it is remarked that the pH value necessary for the dissolution or filtration is slightly dependent on the applied concentration of the acids.

For adjusting the pH value there can be used, for example, alkaline solutions containing caustic alkali, sodium carbonate or bicarbonate which after saturation with carbon dioxide exhibit a pH value which is, within certain limits, all the higher the stronger the alkali contents are. Buffering can also be brought about by other known methods, for example, by the addition of organic or inorganic acids and/or salts thereof. Quite generally care must be taken that the pH value of the buffer solution, depending on its concentration, is lowered by the carboxylic acid which has been added.

The stereoisomeric acids obtained according to the present process are subjected, if desired, to further purification or separation treatments, for example, further reprecipitation, crystallization, conversion into derivatives such as esters or ethers, as well as selective adsorption. These steps can also be combined.

The following examples illustrate the invention:

Example 1

Equilenine is heated to 270–280° C. in 3 portions of 2 grams each time with a mixture of 100 grams of potassium hydroxide and 14 cc. of water. After cooling, the melt is dissolved in water, the solution is acidified with hydrochloric acid and the precipitate is taken up in ether. By extracting the ethereal solution with dilute sodium carbonate solution and again acidifying the alkaline aqueous solution there is obtained an acid mixture which, in the oestrus test on rats has a threshold value of 2–3γ and therefore contains 1.6 to 2.3 million international rat units.

Carbon dioxide is introduced for several hours through a solution of this acid mixture in 10 cc. of saturated sodium carbonate solution and 300 cc. of water. The precipitate is removed by filtration and the clear filtrate is acidified with mineral acid. The thus precipitated acid mixture is dissolved in 3 cc. of saturated sodium carbonate solution and 100 cc. of water and the solution formed is again treated with carbon dioxide. A hydroxy-acid of melting point 240–250° C. is precipitated after a short time. For the purpose of purification it can be converted into a methyl-ether-methylester of melting point 99° C. by treatment with diazomethane and subsequently with dimethylsulfate in dilute caustic soda solution, which ester, on saponification and splitting up of the ether group, yields the pure, free hydroxy-acid, the iso-bisdehydro-doisynolic acid of melting point 254–256° C. and having a rotation $[\alpha]_D^{21}$ +33° (in alcohol). It is stereoisomeric with the monocarboxylic acid of melting point 161–162° C. described further below and is inactive in the oestrus test.

The filtrate obtained in the preparation of the iso acid is acidified with mineral acid whereby a colorless powder of melting point 130–140° C. is precipitated. 0.1–0.2γ of which is active in the oestrus test on rats. For the purpose of further purification also this fraction is converted into the methoxymethylester with diazomethane and dimethylsulfate. This ester is dissolved in petroleum ether, filtered over aluminum oxide and the residue obtained by evaporating the filtrate is recrystallized from methanol. The 1-ethyl-2-carbomethoxy-2-methyl-7-methoxy-1:2:3:4-tetrahydrophenanthrene of melting point 103–104° C. can be converted practically quantitatively, for example, by heating with 4 grams of pyridine hydrochloride to 160–180° C., into the free 1-ethyl-2-methyl-7-hydroxy-1:2:3:4-tetrahydrophenanthrene-2-carboxylic acid, the normal bisdehydro-doisynolic acid of melting point 161–162° C. and having a rotation $$[\alpha]_D^{20} = -117°$$

(in alcohol). With an oral threshold value of 0.05γ on rats this compound is the hitherto most active oestrogenic compound in the oestrus test.

Example 2

Dihydroequilenine is heated to 280–290° C. in 3 portions of 2 grams each time with 100 grams of potassium hydroxide and 15 cc. of water. The solution is separated according to Example 1 into a fraction soluble in sodium carbonate and a fraction insoluble in sodium carbonate, a mixture of crude acids (3.4 grams) being thus obtained which has a threshold value of 0.4γ in the oestrus test and therefore contains 8.6 million international rat units.

This acid mixture is dissolved in 8 cc. of saturated sodium carbonate solution and 200 cc. of water. 1N-tartaric acid solution is added until the pH value amounts to 7.5. The voluminous precipitate thus formed is filtered and the clear filtrate is adjusted to a pH value of between 5.8 and 6.8 with tartaric acid solution. 0.7 to 0.8 gram of crude isobisdehydro-doisynolic acid of melting point 240–250° C. is precipitated, which can be purified by way of the ether-ester as described in Example 1. By precipitating the filtrate with hydrochloric acid there is obtained a fraction (0.93 gram) which on the basis of physiological tests has a threshold value of 0.1γ and contains 7–8 million international rat units, that is to say nearly the total quantity of active substance contained in the crude product. It can be further purified by crystallization, if desired, after an esterification followed by saponification, whereby the normal bisdehydrodoisynolic acid of melting point 161–162° C. already described in Example 1 is obtained.

Example 3

Dihydroequilenine is heated in 4 portions of 2 grams each time with 100 grams of potassium hydroxide and 14 cc. of water in a nickel crucible for 1½ hours to 295–300° C. After cooling, the melt is taken up in water and hydrochloric acid is added to the clear solution. The precipitate is then taken up in either and the ethereal solution is exhaustively extracted with dilute sodium carbonate solution. After further acidifying the alkaline solution with hydrochloric acid there are obtained 5.4–5.6 grams of a crude dark colored acid mixture.

This mixture is dissolved in 20 cc. of absolute acetone and the solution is added to a hot solution of 5 grams of trisodium phosphate in 200 cc. of water, which has been adjusted to a pH value of 8.2–8.4 with a few drops of phosphoric acid. The whole is cooled and allowed to stand for several hours, the undissolved dark by-acids are separated by filtration, the clear filtrate (pH value of about 7.4) is acidified with mineral acid and 1.9 grams of a crystalline product is thus obtained. It is dissolved in 3 cc. of a saturated sodium carbonate solution and 60 cc. of water and carbon dioxide is introduced thereto for some time. The isobisdehydro-doisynolic acid of melting point 254–256° C. is thus precipitated. The pH value of the solution amounts to about 6.5.

The resulting filtrate is mixed with dilute hydrochloric acid and 0.7 grams of bisdehydro-doisynolic acid is thus obtained, which can be purified offhand by recrystallization from dilute methyl alcohol.

Example 4

2 grams of dihydroequilenine in a mixture of 80–100 grams of potassium hydroxide and 10–15 cc. of water are heated in a nickel crucible for 2 hours to 280° C. After cooling, the reaction mass is taken up in water and the resultant solution acidified and extracted with ether. The acid fractions are extracted from the ethereal solution with dilute sodium carbonate solution and precipitated by means of mineral acid. 1.2–1.4 grams of a crude acid mixture are thus obtained.

This mixture is dissolved in dilute caustic soda solution and neutralized with phosphoric acid until an alkaline reaction on phenolphthalein is no longer detected. A phosphate buffer solution of pH value 5.9 is added until the pH value is lowered to 7.6 whereby 0.8–0.9 gram of an inactive acid fraction is precipitated which is removed by filtration. Practically only the two stereoisomeric bisdehydro-doisynolic acids remain in the filtrate; these can be separated and purified according to the methods described in Examples 2 and 3.

The inactive acid fractions including the iso-bisdehydro-doisynolic acid can also be removed in one single operation by adjusting the alkaline solution of the crude acid mixture immediately to a pH value of 5.8, so that only the normal bisdehydro-doisynolic acid remains dissolved in the filtrate after separating the precipitated fractions.

Instead of the hitherto named 7-hydroxy-1:2-dialkylhydrophenanthrene-2-carboxylic acids, also other stereoisomeric hydrophenanthrene-2-carboxylic acids can be obtained in this manner, for example, the 7-hydroxy-1:2-cyclopentano-1:2:3:4-tetrahydrophenanthrene-2-carboxylic acids, the 7-hydroxy-octahydrochrysene-carboxylic acids, further such hydrophenanthrene-2-carboxylic acids which do not contain a hydrocarbon radical in 2-position, for example, the 1-alkyl-7-hydroxy-1:2:3:4-tetrahydrophenanthrene-2-carboxylic acids, or their ring-homologues.

Example 5

10 grams of a mixture of synthetic bisdehydro-doisynolic acid (1-ethyl-2-methyl-7-hydroxy-1:2:3:4-tetrahydrophenanthrene-2-carboxylic acids) of melting point 180–212° C. obtained according to patent application Serial No. 542,812, filed June 29, 1944, are dissolved in 17.5 cc. of 2N-caustic soda solution, and the resulting solution which is practically neutral is diluted with a solution of 2–4 grams of sodium carbonate (=1–2 equivalents) in 700 cc. of water. Carbon dioxide is introduced until the solution is saturated and the precipitated inactive racemic iso-bisdehydro-doisynolic acid of melting point 235–237° C. is suction-filtered. After acidifying the filtrate the racemic normal bisdehydro-doisynolic acid of melting point 204–205° C. is obtained. 0.1γ thereof is active in the oestrus test on rats. The yield is quantitative.

Example 6

2 grams of a mixture of the racemic 1:2-diethyl-7-hydroxy-1:2:3:4-tetrahydrophenanthrene-2-carboxylic acids (obtained, for example, according to patent application Serial No. 542,812, filed June 29, 1944) are dissolved in 3 cc. of saturated sodium carbonate solution and 30 cc. of water. After saturation with carbon dioxide there is obtained a crystalline precipitation (1 gram) which represents the inactive iso-1:2-diethyl-7-hydroxy-1:2:3:4-tetrahydrophenanthrene-2-carboxylic acid of melting point 267–269° C. The active stereoisomeric compound of melting point 193–195° C. is obtained in quantitative yield from the filtrate by adding dilute hydrochloric acid.

What we claim is:

1. A process for separating into its constituent isomers a mixture selected from the group consisting of a purified mixture of stereoisomeric hydrophenanthrene-2-carboxylic acids which contain a hydrocarbon radical in 1-position and a phenolic hydroxyl in 7-position, a mixture of the alkali metal salts thereof, and a mixture of ring homologues thereof, which comprises subjecting the said mixture to the action of an excess of slightly acid solvent medium whereby separation into active and inactive isomers takes place.

2. A process for separating into its constituent isomers a mixture selected from the group consisting of a purified mixture of stereoisomeric hydrophenanthrene-2-carboxylic acids which contain a hydrocarbon radical in 1-position and a phenolic hydroxyl in 7-position, a mixture of the alkali metal salts thereof, and a mixture of ring homologues thereof, which comprises subjecting the said mixture to the action of an excess of solvent medium and adjusting the pH of the latter until it is slightly acid by the addition thereto of the corresponding quantity of a solution of complementary pH, whereby separation into active and inactive isomers takes place.

3. The process defined in claim 1 wherein the hydrophenanthrene-2-carboxylic acids contain a hydrocarbon radical in each of the 1- and 2-positions in addition to a phenolic hydroxyl in 7-position.

4. The process defined in claim 1 wherein the hydrophenanthrene-2-carboxylic acids are 1:2-dialkyl-7-hydroxyhydrophenanthrene-2-carboxylic acids.

5. A process for separating into its constituent isomers a purified mixture of stereoisomeric 1:2-dialkyl-7-hydroxy-phenanthrene-2-carboxylic acids, which comprises dissolving said mixture in a solvent medium having a pH which is on the alkaline side and successively separating said isomers from the solution by the addition of acidifying reagent until the solution is slightly acid whereupon one isomer separates and, after isolation of the said isomer, adding additional acidifying reagent until the other isomer separates out.

6. A process for separating into its constituents a purified mixture of salts of stereoisomeric 1:2-dialkyl-7-hydroxy-hydrophenanthrene-2-carboxylic acids which comprises dissolving said mixture in a solvent medium having a pH which is on the alkaline side and successively separating said isomers from the solution by the addition of acidifying reagent until the solution is slightly acid whereupon one isomer separates and, after isolation of the said isomer, adding additional acidifying reagent until the other isomer separates out.

7. A process for separating into its constituent isomers a purified mixture of stereoisomeric 1:2-dialkyl-7-hydroxy-phenanthrene-2-carboxylic acids, which comprises subjecting the said mixture to the action of a solvent of low initial pH, and adding a pH raising solution until the pH of the mixture is only slightly acid, whereby separation into active and inactive isomers takes place.

8. A process for separating into its constituent isomers a purified mixture of salts of stereoisomeric 1:2-dialkyl-7-hydroxy-phenanthrene-2-carboxylic acids, which comprises subjecting the said mixture to the action of a solvent of low initial pH, and adding a raising solution until the pH of the mixture is only slightly acid.

9. Process for separating the mixture of stereoisomeric 1-ethyl-2-methyl-7-hydroxy-1:2:3:4-tetrahydrophenanthrene-2-carboxylic acids obtained by the action of fused alkali on a member selected from the group consisting of equilenine and dihydroequilenine and purified from by-acids by adjusting a solution of the mixture of the crude acid fractions in sodium carbonate to a pH value of about 7.5, whereupon precipitation of inactive by-acids occurs, which by-acids are removed by filtration, which comprises lowering the pH value of the filtrate to about 5.8 to 6.8, isolating the thus formed 1-ethyl-2-methyl-7-hydroxy-1:2:3:4-tetrahydrophenanthrene-2-carboxylic acid which melts in pure state at about 254–256° C., acidifying the remaining solution with mineral acid and finally isolating the obtained isomeric 1-ethyl-2-methyl-7-hydroxy-1:2:3:4-tetrahydrophenanthrene-2-carboxylic acid which melts in pure state at about 161–162° C.

KARL MIESCHER.
JULES HEER.

REFERENCES CITED

The following references are of record in the file of this patent:

UNITED STATES PATENTS

| Number | Name | Date |
|---|---|---|
| 2,069,096 | MacCorquodale et al. | Jan. 26, 1937 |
| 2,392,137 | Foster | Jan. 1, 1946 |
| 2,361,576 | Tomlinson | Oct. 31, 1944 |
| 2,336,364 | Migrdichian | Dec. 7, 1943 |
| 2,135,062 | Walker | Nov. 1, 1938 |
| 1,945,246 | Witzel | Jan. 30, 1934 |

FOREIGN PATENTS

| Number | Country | Date |
|---|---|---|
| 316,703 | Great Britain | Aug. 8, 1929 |